United States Patent [19]

Swanson et al.

[11] 4,070,175
[45] Jan. 24, 1978

[54] METHOD OF PROCESSING CATTLE EXCREMENT

[75] Inventors: Roger Swanson, Geneva; Duncan M. Thompson, Riverside; Robert J. Shulick, St. Charles, all of Ill.

[73] Assignee: Babson Bros. Co., Oak Brook, Ill.

[21] Appl. No.: 685,785

[22] Filed: May 13, 1976

Related U.S. Application Data

[62] Division of Ser. No. 576,188, May 9, 1975, Pat. No. 3,971,720.

[51] Int. Cl.² .................................................. C05F 3/00
[52] U.S. Cl. ........................................... 71/12; 71/15; 71/22; 71/64 C; 210/73 R; 210/74; 210/77; 426/431
[58] Field of Search ...................... 426/431, 478, 479; 71/12, 15, 21, 22; 210/19, 65, 69, 67, 73, 74, 77, 97

[56] References Cited

U.S. PATENT DOCUMENTS

| | | | |
|---|---|---|---|
| 3,864,255 | 2/1975 | Swanson | 210/67 |
| 3,875,319 | 4/1975 | Seckler et al. | 426/431 |
| 3,959,135 | 5/1976 | Shattock | 71/21 X |

*Primary Examiner*—Thomas G. Wyse
*Assistant Examiner*—Ferris H. Lander
*Attorney, Agent, or Firm*—Wegner, Stellman, McCord, Wiles & Wood

[57] ABSTRACT

A method of separating from ruminant animal feces the undigested fibrous material that is preponderantly short pieces which consist of bundles of capillary tubes. The feces are mixed with urine, water from animal washing and preparation for milking, and with other water if needed, to form a homogeneous slurry which is run through tandem perforate drum and roller squeezers that heavily compress the short pieces to express liquid from them while continuously draining off a filtrate of liquid and fine solids which is ultimately put into a pond for use as liquid fertilizer. This leaves a filter mass which is preponderantly the short pieces. The filter mass is mixed with clean water to form a suspension which is run through tandem perforate cylinder roller pressers that compress the short pieces under several times heavier pressure to produce a cleansed filter mass and a filtrate which is combined with the original slurry. The cleansed filter mass is excellent bedding which is substantially odorless and effectively free of harmful bacteria.

18 Claims, 8 Drawing Figures

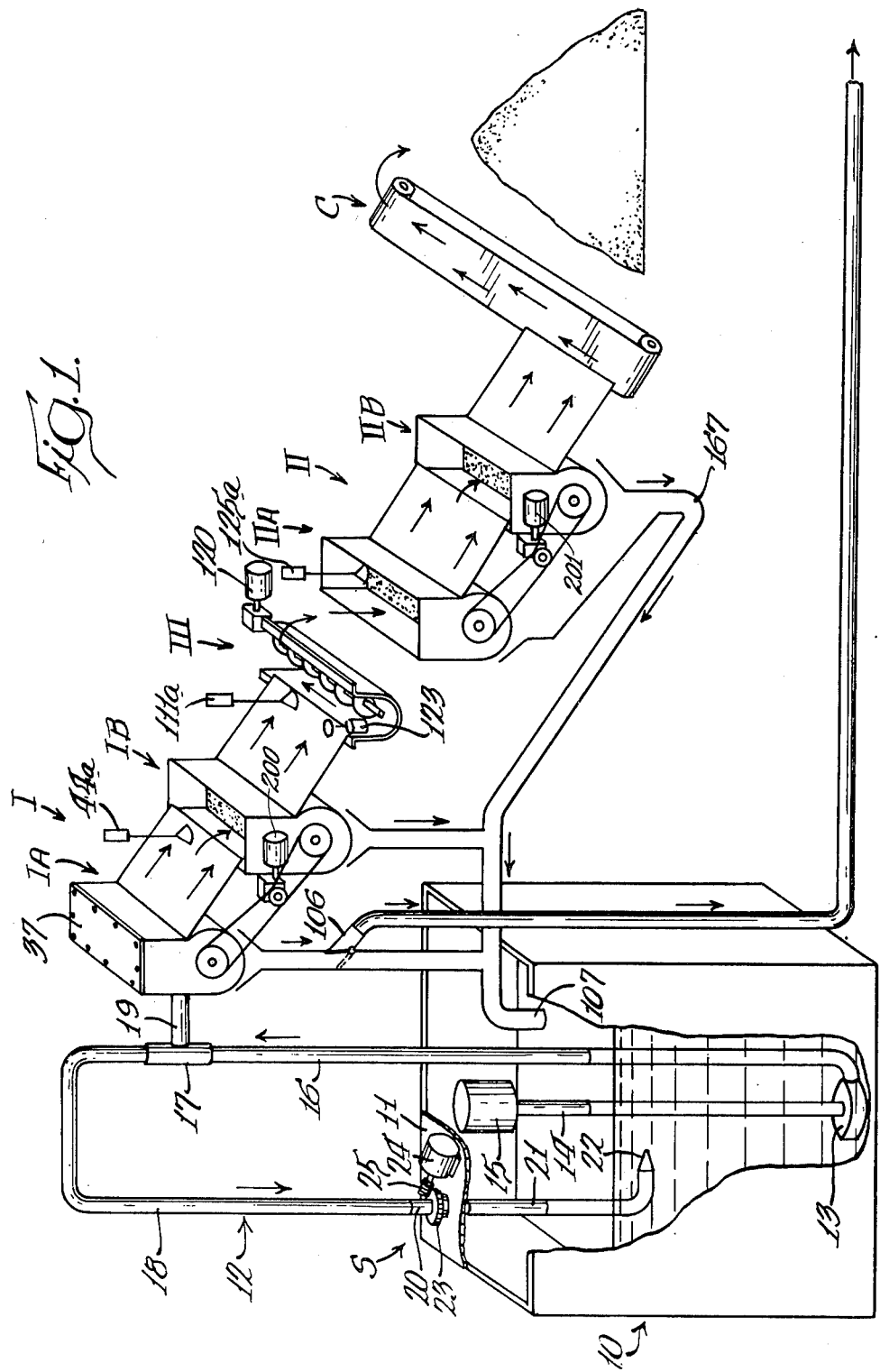

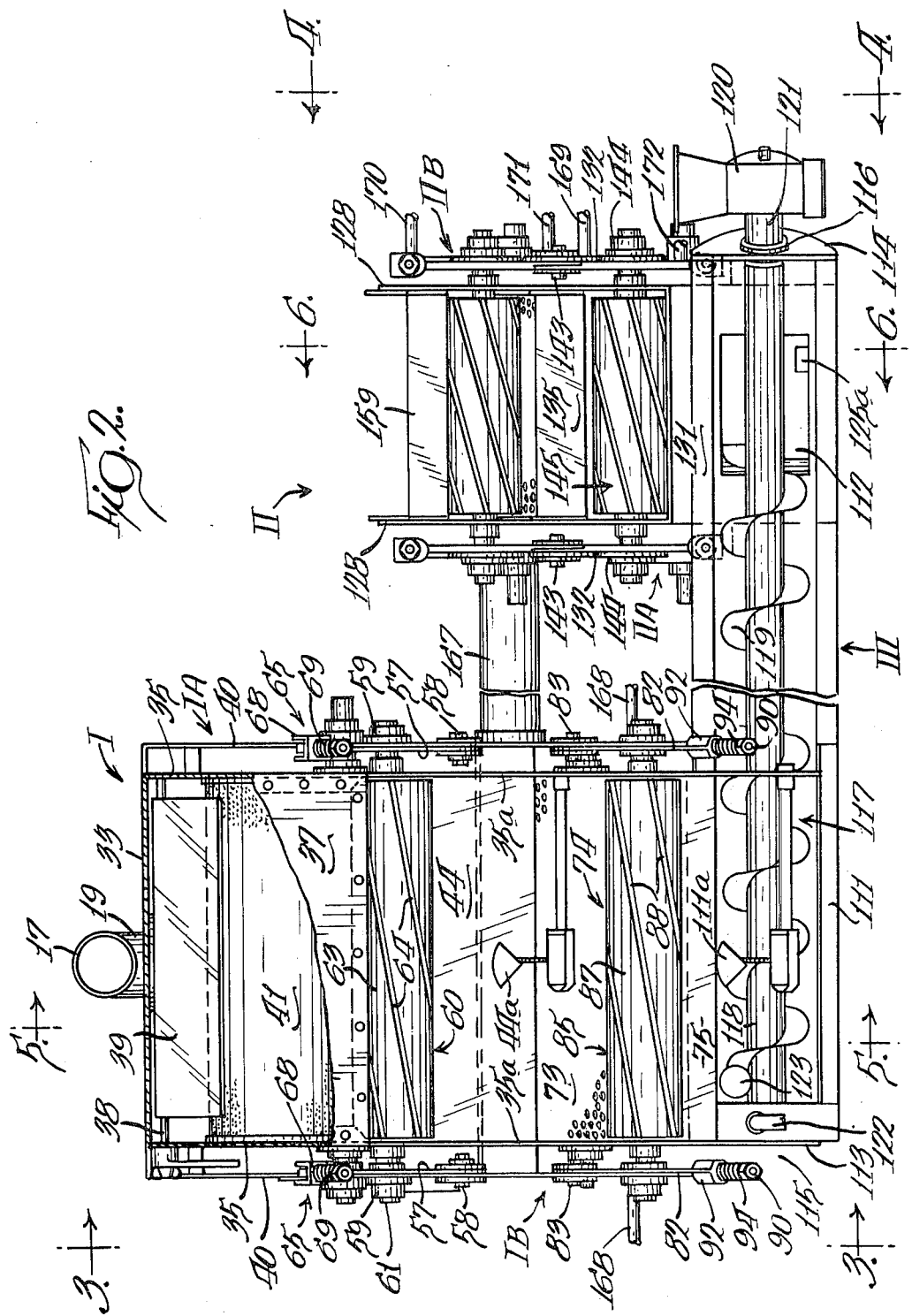

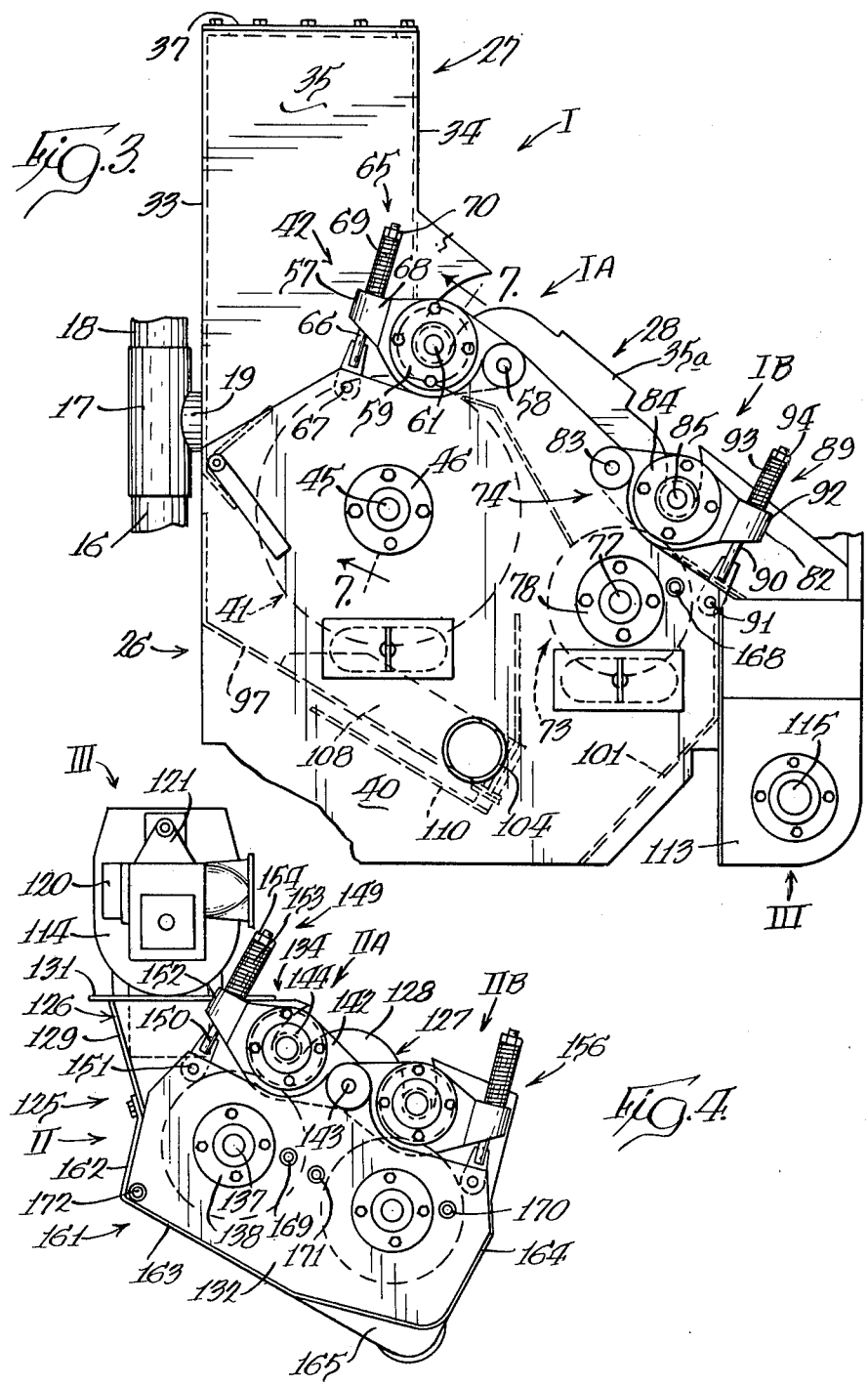

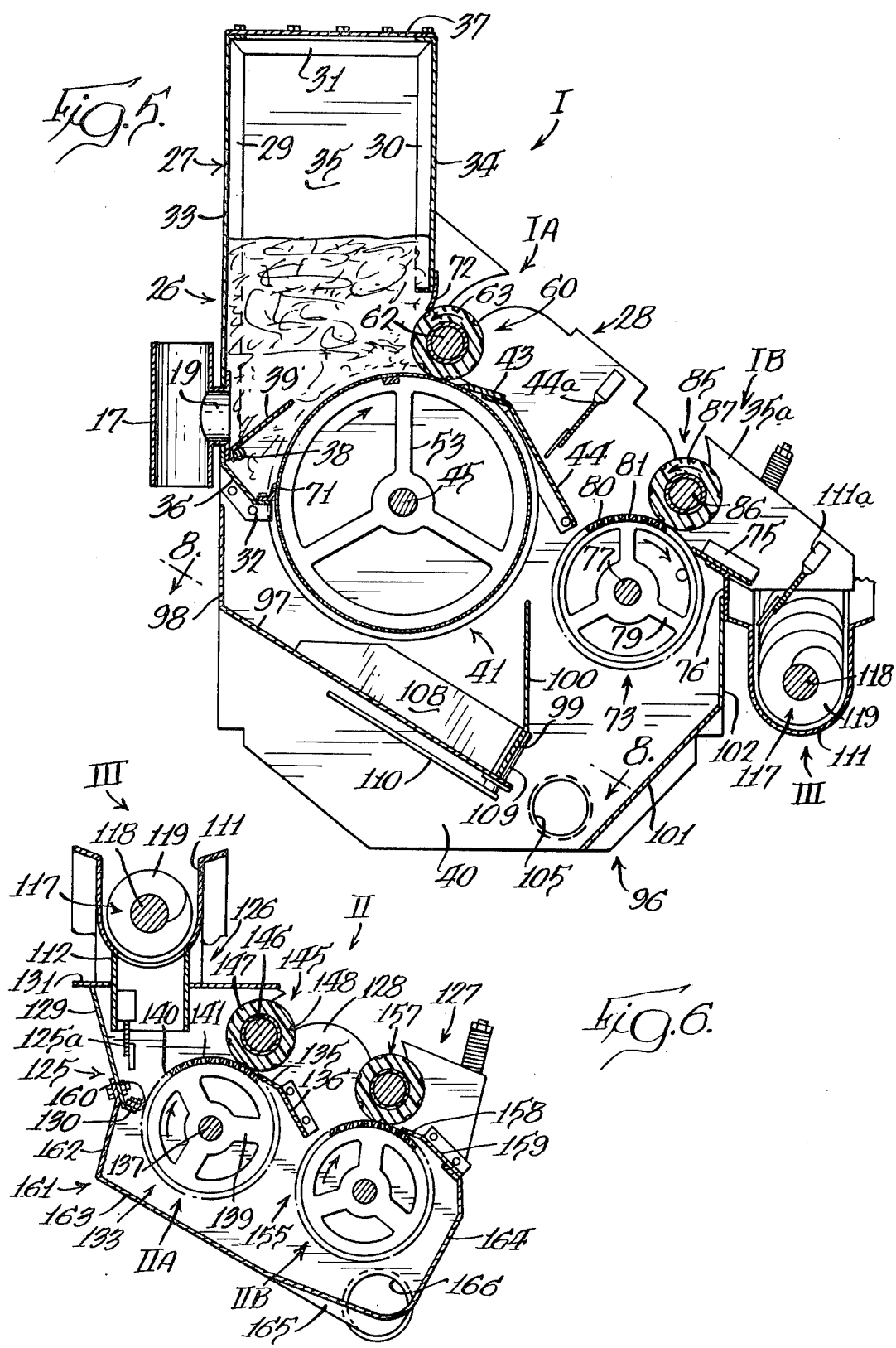

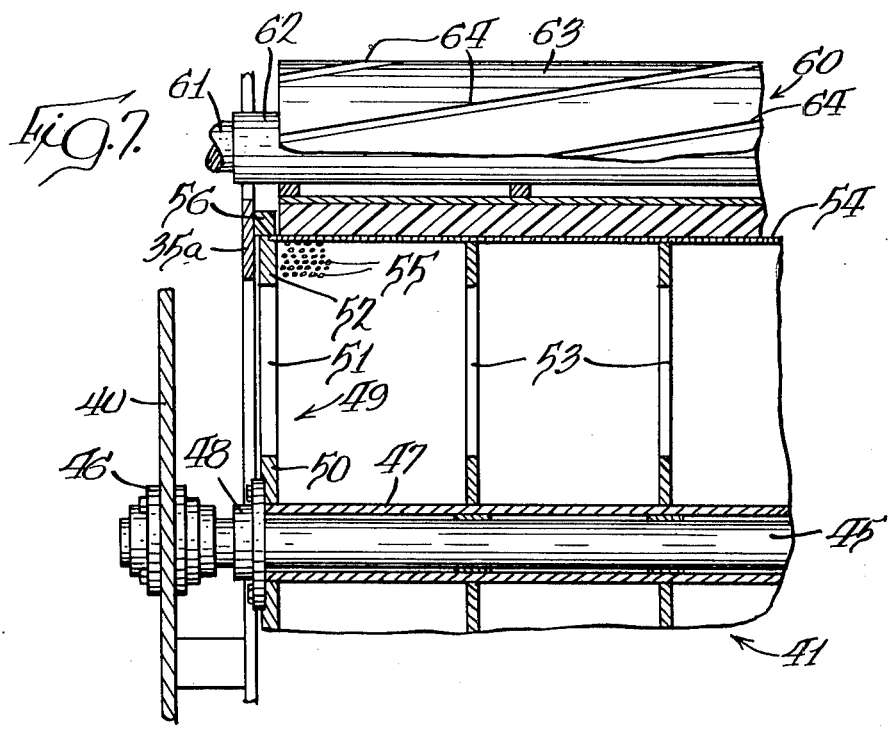
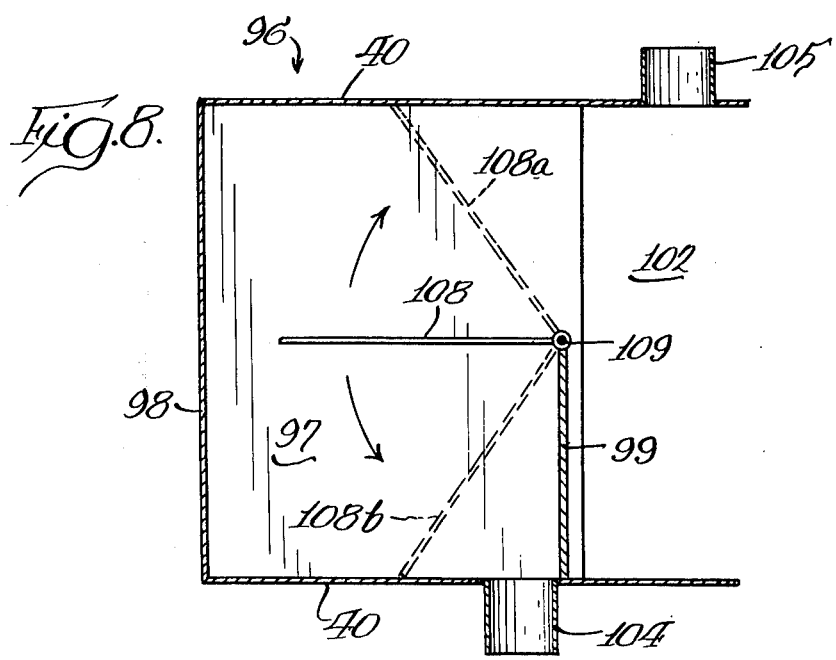

METHOD OF PROCESSING CATTLE EXCREMENT

This is a division, of application Ser. No. 576,188 filed May 9, 1975 now U.S. Pat. No. 3,971,720 issued July 27, 1976.

BACKGROUND OF THE INVENTION

Many efforts have been made to develop improved ways of handling cattle excrement and waste water from the cleaning of cattle and preparing them for milking. While such material has some value as fertilizer, modern farming methods rely much more heavily upon chemical fertilizers to provide carefully balanced soil nutriments; and the animal wastes are spread on the fields principally as a means of distributing them where they can leach into the soil and be of some additional benefit.

Agricultural authorities have recognized for some time that ruminant animal feces contain substantial amounts of undigested fibrous material which is preponderantly short pieces that consist of bundles of capillary tubes. The undigested fibrous material has little value for soil building purposes, and in recent years several efforts have been made to separate it from the remaining waste material and recover it in a useable form. Conversely, except for the liquid in and around the capillary tubes of the fibrous material, practically all of the valuable soil improving chemicals in the animal waste are not in the undigested fibrous material. The fibrous material is coarse enough that it makes the natural animal waste very difficult to handle with anything but mechanical spreaders; whereas, if the fibrous material can be separated from the liquids and finer solids, the latter can be handled by an ordinary slurry pump which distributes it like liquid fertilizer.

SUMMARY OF THE INVENTION

The principal object of the invention is to provide a method, or process and apparatus for rapidly and inexpensively separating the feces of ruminant animals into a mass of cleansed fibrous material which may be used for such purposes as animal bedding, and a filtrate of liquid and fine suspended solids which may be used as a liquid fertilizer.

A further object of the invention is to provide apparatus for performing the above defined method or process which is sufficiently compact, reliable and inexpensive that it may be purchased and operated by dairy farmers having moderate sized dairy herds.

the complete system includes a storage pit which receives feces, urine, wash water and prep water which forms a slurry. A pit which is 15 feet by 15 feet by 10 feet deep will provide storage of the average daily input from a 100 cow herd for 5 days at an average input of 33 gallons per cow per day.

Prior to processing through the separation apparatus, the slurry is agitated for a period of about 15 minutes to assure that it is homogenous. The homogenous slurry is then started through the separating apparatus which includes a first stage tandem separator, an auger to receive the solid filter mass from the first stage separator and mix it with water to form a suspension, and a tandem second stage separator which receives the suspension from the auger and completes the processing of the fibrous material.

In the present disclosure, the term "filter mass" is used to define the solid material which is carried through the two separation stages and constitutes the fibrous end product that is suitable for use as bedding. The term "filtrate" is used to define the mixture of liquids and finer solids, there being a first filtrate which is separated from the filter mass in the first stage, and a second filtrate which is separated from the filter mass in the second stage. The first stage separator has a filtrate discharge with a diverter so that the flow of filtrate may be directed either to a liquid retention pond or returned to the pit to be remixed with the slurry. The latter course is followed only if the total volume of liquids in the slurry is insufficient for proper processing. Ultimately, the first filtrate goes to the storage pond for use as liquid fertilizer. The second filtrate consists principally of water with very small quantitites of liquids which are desirable for use as fertilizer and with some small quantities of suspended solids, so it is always returned to the slurry storage pit.

The tandem separator units of the first stage separator and the tandem separator devices of the second stage separator all consist of a driven foraminous drum, a squeeze roller or pressure roller, and a scraper which removes the filter mass from the drum surface. The rollers are forced against the drum surfaces under heavy spring pressure, and the rotation of the foraminous drums forces the filter mass through the nip between the drum and the roller, and onto the scraper. As will be described in detail, the drum structures and roller structures differ in the various units, as do the spring pressures applied to the rollers. The objective of the apparatus is to heavily compress the short pieces of fibrous material so as to express as much liquid as possible from the capillary tubes which form the body of each piece of the fibrous material. "Dirty" liquid is expressed from the capillary tubes in the first stage separation, and the tubes take up clean water when the filter mass is formed into a suspension before going through the second stage separation. The second stage separation compresses the fibrous particles much more heavily then does the first stage separation, thus expressing the clean water and residual "dirty" liquid from the capillary tubes in a sort of flushing action. As a result, the filter mass delivered by the second stage separator is thoroughly cleansed, odorless, and substantially free of harmful bacteria. Material produced experimentally has been tested for klebsiellae and salmonellae bacteria, and the counts have been negative. There have been positive counts on other types of bacteria; but in reasonably extensive experimental use of the product for bedding, no animal illness has been attributed to the bedding.

The economics of the method and the apparatus are extremely favorable. Based on experimental data accumulated to date, the cleansed fibrous material from 100 cows will produce approximately 36,500 cubic feet of bedding a year at a cost of about 79 cents per 100 cubic feet.

The filtrate sent to the retention pond has an estimated nutrient value of approximately $21.35 per day per 100 cows, based upon the following figures:

1. Nitrogen. 36 pounds per day equals $9.80; based upon the fact that a 28% nitrogen fertilizer costs $150.00 a ton.

2. Phosphorus. 46 pounds per day, or $9.70 per day; based upon the fact that a 46% phosphorus fertilizer costs $93.00 a ton.

3. Potassium. 26 pounds per day, or $1.85 per day; based upon the fact that a ton of 60% potassium fertilizer costs $85.00.

The filtrate delivered to a retention pond is sufficiently dilute that it may be pumped by an irrigation system or handled by vacuum tank vehicles. The suspended solids in the filtrate rise to the surface and form a crust so that the retention pond is substantially odor free also.

The typical "output" for a representative herd is as follows:

1. Volume of raw waste 1000–1200 gallons per day per 100 cows.
2. Minimum diluent water-800 gallons per day per 100 cows.
3. Typical processing time-1 to 1½ hours per day per 100 cows.
4. Cubic feet of recovered fibre-100 cubic feet per day per 100 cows.
5. Filtrate to pond-1300–1500 gallons per day per 100 cows when using 800 gallons per day per 100 cows of diluent water.
6. Electric power requirement-31 kilowatt hours. At 2.5 cents per kilowatt hour the operating cost for the above output is 79 cents.

THE DRAWINGS

FIG. 1 is a diagrammatic showing of a system embodying the invention;

FIG. 2 is a plan view of the apparatus, with parts broken away, showing the first and second stage tandem structures and the conveyor for moving the filter mass from one to the other;

FIG. 3 is a side elevational view taken substantially as indicated along the line 3—3 of FIG. 2, omitting the second stage apparatus for clarity of illustration;

FIG. 4 is a side elevational view taken substantially as indicated along the line 4—4 of FIG. 2, omitting the first stage apparatus for clarity of illustration;

FIG. 5 is a sectional view taken substantially as indicated along the line 5—5 of FIG. 2;

FIG. 6 is a sectional view taken substantially as indicated along the line 6—6 of FIG. 2;

FIG. 7 is a fragmentary sectional view on an enlarged scale taken substantially as indicated along the line 7—7 of FIG. 5; and FIG. 8 is a fragmentary sectional view taken substantially as indicated along the line 8—8 of FIG. 5.

DETAILED DESCRIPTION OF THE INVENTION

General Description of the System

Referring first to FIG. 1, the system of the present invention includes a slurry storage pit, slurry agitating and slurry delivery means, indicated generally at S; a first state separator, indicated generally at I, which includes a first separator unit IA and a second separator unit IB; a second stage separator, indicated generally at II, which includes a first separator device IIA and a second separator device IIB; and a conveyor-suspension developer, Indicated generally at III, which receives the filter mass from the first stage separator I, mixes it with water to form a suspension, and delivers it to the second stage separator II.

Filtrate from separator unit IB and from separator devices IIA and IIB is returned to the pit. Filtrate from the unit IA is selectively delivered to a pond or returned to the pit.

The cleansed filter mass from the second stage separator II may conveniently be received by a conventional apron type conveyor, indicated generally at C, which delivers the cleansed filter mass to a storage pile which is in any convenient sheltered location.

FIG. 2 shows that the actual layout of the system is quite different from the diagrammatic showing of FIG. 1, which is to be understood as providing a basic component identification and flow sheet. In practice, the elements I, II and III are directly above the slurry pit S, and most of the conduits shown in FIG. 1 do not exist. Filtrate from the first stage separator which is to return to the pit flows out the bottom of the separator into the pit. Filtrate from the second stage separator II flows through a short conduit into the bottom of the first stage separator I.

The Slurry Storage Pit, Agitator and Slurry Delivery

Referring further to FIG. 1, a slurry storage pit, indicated generally at 10, consists of a rectangular storage tank which is below the level of the barn and milk house floors in a location where it may be easily filled with animal excrement, and wash water and prep water from the milk house. In most areas of the country, additional water may be added to the slurry in the storage pit 10 in order that the slurry may have a proper viscosity for handling in the system. In a location where water is in short supply, the slurry may be thinned by returning to the storage pit 10 some or all of the filtrate from the first stage separator I as well as from the second stage separator II, with the first filtrate being sent to the storage pond only after some recycling. Thin slurry is about 5% solids; thick about 10%.

The slurry storage pit 10 is provided with a cover 11 that has openings for conduits which are part of a slurry agitating and delivery system, indicated generally at 12, and for conduits which are part of the filtrate handling system IV. There are, of course, also suitable removable access closures for servicing components which are inside the storage pit.

The slurry agitating and delivery system 12 includes a slurry pump 13 which is located in the bottom of the pit 10 and is connected by a vertical drive shaft in a pipe 14 with an electric motor 15. The present system may utilize, for example, a ten horsepower single phase motor 15 driving a 600 gpm pump at 800 rpm.

The pump 13 delivers slurry through a delivery conduit 16 to a tee 17 from which a first branch 18 returns to the pit 10 and a second branch 19 connects with the first stage separator I.

The return conduit 18 is connected to a rotary joint 20 which is journalled in the pit cover 11, and fixedly secured to the rotary joint 20 is a conduit 21 which terminates in a generally horizontally disposed agitating nozzle 22. The joint 20 is surrounded by a gear 23 so that it may be driven from an electric motor 24 through a worm 25. The supply of slurry in the pit 10 may be rendered substantially homogeneous by operating the pump 13 in conjunction with the motor 24 for rotating the agitating nozzle 22 with the flow of slurry through the tee 17 being entirely into the return conduit 18. It has been found that about 15 minutes of agitation of the slurry is desirable before any portion of it is delivered through the conduit 19 to the first stage separator I.

The First Stage Separator I

Referring now particularly to FIGS. 2, 3 and 5, the first stage separator I includes a casing, indicated generally at 26, part of which provides a hopper, indicated generally at 27, and the rest of which forms a housing, indicated generally at 28, for the separator units IA and IB. The casing 26 is best seen in FIG. 5 to include a hopper frame formed of angle members that include laterally spaced rear upright angle members 29, front angle members 30, top angle members 31, and a lower transverse structural member 32. A hopper back panel 33 is secured to the rear angles 29, a hopper front panel 34 is secured to the front angles 30, side panels 35 are mounted on the rear and front angles 29 and 30, and a lower plate 36 is carried upon the structural members 32. Surmounting the hopper is a sealed top wall 37 which is secured by bolts so that it is removable for access to the interior of the hopper. The back panel 33 of the hopper has an opening through which the conduit 19 communicates with the interior of the hopper. A cross rod 38 which is pivotally supported in the rear angles 29 carries a deflector plate 39 which may be moved from the position illustrated in FIG. 5 to a position nearer the delivery conduit 19. Its purpose is to prevent slurry from being pumped directly against the drum and roller of the first separator unit IA.

As seen in FIGS. 3 and 5, the hopper slide plates 35 have forwardly extending portions 35a which provide the sides of the housing 28 for the separator units IA and IB; and spaced laterally outwardly from the side plates 35–35a are external lateral frame plates 40 which provide supports for the components of the two separator units.

The first separator unit IA consists generally of a foraminous separating drum assembly, indicated generally at 41; a squeeze roller assembly, indicated generally at 42; and a scraper 43 which is mounted upon an inclined slide plate 44 upon which a filter mass which is separated from the slurry in the first separator unit slides by gravity into the second separator unit.

Referring now particularly to FIGS. 5 and 7, the foraminous separator drum assembly 41 includes a transverse shaft 45 which is journalled in bearings 46 in the external lateral frame plates 40; and fixedly carried upon the shaft 45 is a tube 47 which cooperates with fixed annular members 48 to receive drum end members, indicated generally at 49, which include central discs 50, three radial arms 51, and annular circumferential drum skin supports 52. Between the drum end members 59 are several intermediate drum skin supports 53 which are like the drum end members 49 but of lighter construction. A drum skin 54 is of foraminous sheet metal having an evenly distributed pattern of 0.125 inch diameter holes 55 that are on staggered centers 0.1875 inch apart so that the formaminous skin 54 is 40% open area. Bonded to the inner surfaces of the side plate portions 35a surrounding the drum end members 49 are annular seals 56 which are in sealing contact with the circumferential surfaces of the skin supports 52 and the extreme end portions of the skin 54 as seen in FIG. 7. In practice, the drum is 24 inches long and 18 inches in diameter.

Referring now particularly to FIGS. 2, 3, 5 and 7, the squeeze roll assembly 42 includes a pair of arms 57 which are mounted upon the external lateral frame plates 40 on pivots 58. Bearings 59 in the pivoted arms 57 rotatably support a squeeze roller, indicated generally at 60, which consists of a shaft 61 journalled in the bearings 59, an enlarged central portion 62, and a polyurethane sleeve 63 which is bonded to the portion 62. The shaft 61 extends through slots in the plates 35–35a which are arcs of circles about the pivots 58. In practice, the squeeze roller 60 is five inches in diameter, with the enlarged shaft portion 62 providing a three inch core surrounded by a one inch polyurethane sleeve which has a durometer of 45 (Shore A) and which is provided with eight grooves 64 that are 0.0625 inch deep, 0.25 inch wide, and have a 9½° lead so that they make ¼ turn of the roll in its 23½ inch length. Grooves 64 enhance feeding of the filter mass between squeeze roller 60 and drum skin 54. The spiral configuration minimizes loading of the grooves with fibers and distributes any deflection of the roller due to fibers packed in the groove throughout the roller revolution.

The squeeze roll assembly 42 also includes means, indicated generally at 65, for forcing the squeeze roller 60 against the drum skin 54 with a heavy pressure. As seen in FIG. 3, each of the means 65 includes a rod 66 which is pivoted at 67 on the lateral frame plate 40 and which extends through a hole in an inverted channel member that provides a saddle 68 at the free end of the arm 57. A compression spring 69 surrounds the rod 66 and is adjustably prestressed by means of a nut 70 which screws onto a threaded end portion of the rod 66. In practice, the springs 69 may have a rate of 240 pounds per inch of deflection, and are preloaded to 125 pounds. The contact of the roller 60 with the drum skin 54 is 15° downstream from the vertical diameter of the drum.

The first separator unit is completed by a lower flexible seal 71 which is mounted upon the lower plate 35 and bears upon the foraminous skin 54 of the drum assembly 41, and a rather stiffly flexible upper seal 72 which is mounted upon the front hopper wall 34 and bears upon the squeeze roller 60. The seal 72 is sufficiently stiff that it also acts as a squeegee which scrapes adhered solid material from the squeeze roller so that as such material builds up it may fall off the roller and onto the slide 44.

It has been found that although the present apparatus functions entirely satisfctorily with a hopper that is not sealed, the sealed hopper as here disclosed substantially increases the rate in which the slurry may be processed through the first separator unit IA. As long as the drum is rotating, the gas pressure in the top of the hopper 27 forces liquid through the drum; but when drum rotation is stopped, the solids in the slurry promptly seal the holes 55 in the foraminous drum skin and also maintain the seal at the annular seals 56. If the pressure in the hopper exceeds the head pressure in return conduit 18 all of the slurry discharged by pump 13 is recirculated through nozzle 22.

The second separator unit IB consists generally of a second foraminous separator drum assembly, indicated generally at 73; a squeeze roller assembly, indicated generally at 74; and a scraper 75 which is mounted upon a transverse bracket plate 76 that is at the front of the housing 28 where the filter mass which is separated from the slurry in the second separator unit slides directly into the conveyor-suspension generator III.

Referring now particularly to FIGS. 5 and 7, the second foraminous separator drum assembly 73 is in all structural respects like the assembly 41. Generally, it includes a transverse shaft 77 which is journalled in bearings 78 in the external lateral frame plates 40; and fixedly carried upon the shaft 77 are drum end members and drum skin supports 79. A drum skin 80 is of foraminous sheet metal having rows of 0.25 inch diameter holes 81 that are 0.5 inch apart in the rows with an angular separation of 6° between rows. The foraminous skin 80 is 20% open area. Bonded to the inner surfaces of the side plate portions 35a surrounding the ends of drum 73 are annular seals which are like the seals 56 in structure and function. In practice, the second drum is 24 inches long and 10 inches in diameter. Drive means including a motor 200 (FIG. 1) drives the first stage separator drums 41 and 73.

Referring now particularly to FIGS. 2, 3, 5 and 7, the squeeze roll assembly 74 includes a pair of arms 82 which are mounted upon the external lateral frame plates 40 on pivots 83. Bearings 84 in the pivoted arms 82 rotatably support a squeeze roller, indicated generally at 85, which includes a central core 86 and a polyurethane sleeve 87 which is bonded to the core 86. In practice the squeeze roller 85 is 5 inches in diameter, with the core 86 three inches and the polyurethane sleeve 87 being one inch and having a durometer of 55 (Shore A). The sleeve is provided with eight grooves 88 that are 0.0625 inch deep, 0.25 inch wide, and have a $9\frac{1}{2}°$ lead so that they make $\frac{1}{4}$ turn of the roll in its $23\frac{1}{2}$ inch length.

The squeeze roll assembly 74 also includes means, indicated generally at 89, for forcing the squeeze roller 85 against the drum skin 80 with a heavy pressure. As seen in FIG. 3, each of the means 89 includes a rod 90 which is pivoted at 91 on the lateral frame plate 40 and which extends through a hole in an inverted channel member that provides a saddle 92 at the free end of the arm 82. A compression spring 93 surrounds the rod 90 and is adjustably prestressed by means of a nut 94 which screws onto a threaded end portion of the rod 90. In practice, the springs 93 may have a rate of 500 pounds per inch of deflection, and are preloaded to 250 pounds. The contact of the roller 85 with the drum skin 80 is 30° downstream from the vertical diameter of the drum.

Referring now particularly to FIGS. 5 and 8, at the bottom of the first stage separator I is a filtrate receiver structure, indicated generally at 96. The structure 96 includes an inclined rear pan 97 which has an integral upright rear wall 98 aligned with the rear hopper wall 33; and the rear pan 97 and its rear wall 98 are welded along their side edges to the external lateral frame plates 40. Substantially at the forward edge of the inclined pan 97 is a perpendicular intermediate pan 99 which is seen in FIG. 8 to extend only half way across the pan 97; and as seen in FIG. 5 the intermediate pan 99 is surmounted by a vertical partition 100 that extends entirely across the machine between the lateral frame plates 40. Spaced forwardly of the intermediate pan 99 and the upright partition 100 is a front pan that includes lower portion 101 which directs filtrate through an opening in the pit cover 11 and a vertical upper portion 102 that, in effect, forms the front of the housing 28.

The filtrate receiver structure 96 is provided at one side with an opening having a collar 104 to which a conduit 106 is connected. As seen in FIG. 1, the conduit 106 goes to a storage pond from which the filtrate may be removed for use as fertilizer. The collar 104 is seen in FIG. 8 to be substantially at the intersection of the rear inclined pan 97 and the perpendicular intermediate pan 99; and a diverter 108 is pivoted at 109 so that it may be moved by means of an external handle 110 (FIG. 5) between a first limit position 108a and a second limit position 108b which are indicated in broken lines in FIG. 8. When the diverter is in the position 108a, one hundred percent of the filtrate from the first separator unit IA, disregarding leakage under the diverter 108, goes through the collar 104 and the conduit 106 to the pond. With the diverter in the position 108b, one hundred percent of the filtrate from the first unit IA, disregarding leakage, is diverted past the intermediate pan 99 and flows off the front of the rear pan 97 into the slurry pit 10. Since the filtrate that drains through the skin 54 of the first perforated separator drum assembly 41 drains across the entire width between the side plates or panels 35–35a, by adjusting the diverter 108 between its A position and its B position an operator can exercise a rough control over the percentage of filtrate that goes to the pond and the percentage that returns to the pit. Thus, disregarding leakage, from zero to 100% may go to the pond and the balance to the pit.

A frame (not shown) stands on the pit cover 11 and supports the first stage separator I above the opening through which the filtrate returns to the pit.

The Conveyor-Suspension Developer III

As best seen in FIGS. 2 and 5, the conveyor-suspension developer III extends across the front of the first stage separator I and across the rear of the second stage separator II, and it is seen in FIG. 5 to be upwardly inclined from the first stage separator to the second stage separator. In practice, the angle of inclination is 20° from the horizontal.

As seen in FIG. 3, the conveyor-suspension developer includes a flanged U-shaped trough 111 which is secured to the upright front wall 102 of the filtrate receiver means 96. As best seen in FIGS. 2 and 6, the trough 111 extends above the rear end portion of the second stage separator II where it has a discharge opening 112 above the rear of the first separator device IIA. The trough 111 has an infeed end panel 113 and an outfeed end panel 114; and bearings 115 and 116 in the respective end panels rotatably support a helical conveyor, indicated generally at 117, which consists of a shaft 118 and flight 119. The shaft projects through the bearing 116 in the outfeed end panel 114 and is drivingly connected to an electric gear motor 120 which is supported upon the end panel 114 by a bracket 121. The conveyor 117 is 6 inches in diameter and 8 feet long, and is driven at a speed of 115 rpm. The flight 119 clears the bottom of the trough 111 by about $\frac{1}{4}$ inch.

At the infeed end portion of the trough 111 is an inlet 122 for fresh water which is mixed with the filter mass from the second separator unit IB to form a suspension of the fibrous material. The heavily compressed and squeezed capillaries of the fibrous material have had most of the "dirty" liquid and naturally occurring mucous squeezed out of them in the first stage separator, and they promptly absorb fresh water which is subsequently expressed in the second stage separator II, so the capillaries of the fibrous material undergo a sort of flushing action. Where water is scarce, the step of forming a suspension may be eliminated; although the resulting solid end product is not quite as clean as that produced by the preferred method.

Admission of water to the trough 111 through the inlet 122 is controlled by a manual valve (not shown); and is also controlled by a pressure switch 123 in the form of an inverted cup which has a fitting by means of which it is mounted on the side of the trough adjacent the lower end of the auger. When the liquid level rises into the cup it suspends the flow of water through the inlet 22.

As seen in FIG. 5, paddle switches 44a and 111a are suspended, respectively, above the slide 44 and the infeed area of the trough 111. Each such paddle switch serves exclusively a safety function to shut off the pump 13 and/or the first stage separator in the event of malfunction or over supply of the second separator unit IB or of the helical conveyor 117.

The Second Stage Separator

Referring now particularly to FIGS. 2, 4 and 6, the second stage separator II is seen to be quite similar in general construction to the first stage separator I; but it is considerably smaller. The second stage separator has a casing, indicated generally at 125, which includes a hopper portion, indicated generally at 126, and a housing portion, indicated generally at 127. Side panels 128 are joined by a back panel 129 that has a small forwardly extending bottom flange 130; and surmounting the back panel 129 and side panels 128 is a hopper closure 131 which has a central opening to receive material from the conveyor outfeed 112.

Spaced outwardly from the side panels 128 are lateral frame plates 132 which carry the bearings for the foraminous cylinders and pressure rollers of the separator devices IIA and IIB of the second stage separator. Except for the fact that the cylinders and the pressure rollers are shorter than are the separator drum assembly 73 and squeeze roller 85 of the separator unit IB, and the pressure rollers have sleeves of higher durometer, the components of the separator devices IIA and IIB are substantially identical with those of the separator unit IB.

The first separator device IIA consists generally of a first foraminous separator cylinder assembly, indicated generally at 133; a pressure roller assembly, indicated generally at 134; and a scraper plate 135 which is supported upon a slide 136 that feeds a partially cleansed filter mass into the second separator device IIB.

The first foraminous separator cylinder assembly 133 is in all structural respects like the assembly 73. Generally, it includes a transverse shaft 137 which is journalled in bearings 138 in the lateral frame plates 132; and fixedly carried upon the shaft 137 are cylinder end members and cylinder skin supports 139. A cylinder skin 150 is of foraminous sheet metal having rows of 0.25 inch diameter holes 141 that are 0.5 inch apart in the rows with angular separation of 6° between rows. The foraminous skin 140 is 20% open area. Bonded to the inner surfaces of the side panels 128 surrounding the ends of cylinder 133 are annular seals which are like the seals 56 in structure and function. In practice, the first cylinder is 15 inches long and 10 inches in diameter.

Referring now particularly to FIGS. 2, 4 and 6, the pressure roll assembly 134 includes a pair of arms 142 which are mounted upon the lateral frame plates 132 on pivots 143. Bearings 144 in the pivoted arms 142 rotatably support a pressure roller, indicated generally at 145, which includes a central core 146 and a polyurethane sleeve 147 which is bonded to the core. In practice the pressure roller 145 is five inches in diameter, with the core 146 3 inches and the polyurethane sleeve 147 being one inch and having a durometer of 70 (Shore A). The sleeve is provided with eight grooves 148 that are 0.0625 inch deep, 0.25 inch wide, and have a 15° lead so that they make ¼ turn of the pressure roll in its 23½ inch length.

The pressure roll assembly 134 also includes means, indicated generally at 149 (FIG. 4), for forcing the pressure roller 145 against the cylinder skin 140 with a heavy pressure. Each of the means 149 includes a rod 150 which is pivoted at 151 on the lateral frame plate 132 and which extends through a hole in an inverted channel member that provides a saddle 152 at the free end of the arm 142. A compression spring 153 surrounds the rod 150 and is adjustably prestressed by means of a nut 154 which screws onto a threaded end portion of the rod 150. In practice, the springs 153 may have a rate of 2700 pounds per inch of deflection, and are preloaded to 1300 pounds. The contact of the pressure roller 145 with the cylinder skin 140 is 30° downstream from a vertical diameter of the cylinder.

The second separator device IIB is identical to the device IIA, and thus is described only generally as including a foraminous cylinder assembly, indicated generally at 155; a pressure roller assembly, indicated generally at 156, which includes a pressure roller 157; and a scraper 158 which is integral with a slide plate 159 that delivers cleansed fibrous material to the conveyor C (FIG. 1). It differs only in that the contact of the pressure roller 157 with the cylinder assembly 155 is 15° downstream from the vertical diameter of the cylinder, instead of 30° as is the case with the pressure roller 145. Drive means including a motor 201 (FIG. 1) drives the second stage separator cylinders 133 and 155.

On the forwardly projecting flange 130 at the bottom of the hopper back panel 129 is a flexible sealing strip 160 which bears against the skin 140 of the separator cylinder assembly 133.

A second filtrate receiver structure, indicated generally at 161, includes a rear pan 162 which connects to the hopper rear wall 129; a downwardly and forwardly inclined bottom pan 163, and a forward pan 164 which connects to the underside of the slide 159. Both sides of the pans are welded to the lateral frame plates 132; and the lower, forward end portion of the bottom pan 163 is laterally inclined as seen at 165 to direct the second filtrate into an outlet opening which has a collar 166. A conduit 167 connects the collar 166 to a collar 105 (FIG. 8) that surrounds an opening in the adjacent lateral frame plate 40 of the first stage separator I, so the second filtrate drains directly into the pit from beneath the first stage separator.

As seen in FIG. 6, the hopper 125 of the second stage separator II is provided with a paddle switch 125a which operates to stop the conveyor drive motor 120 and the first stage separator if there is an excessive quantity of suspension in the hopper 126.

Flushing System

A shearing action on the solid material passing through both separator stages results principally from the fact that the squeeze rollers 60 and 85 and the pressure rollers 145 and 157 are frictionally driven from the drums and cylinders, respectively; and the driving force must be transmitted through the solid material.

There are several areas of the apparatus in which the filtrate may be so viscous or so small in quantity that it tends to clog and foul the apparatus; and to avoid this a water flushing system is provided. FIGS. 2 and 3 show pipes 168 which supply water to nozzles at opposite sides of the housing 28 to flush the interior of the foraminous separator drum for the separator unit IB.

FIGS. 2 and 4 show pipes 169 and 170 which deliver water to nozzles for flushing the interiors of the foraminous cylinders in the second stage separator devices IIA and IIB, respectively. A pipe 171 supplies a set of nozzles which flush the outer faces of the two cylinders. At the rear, upper end of the bottom pan 163 of the second stage separator is a pipe 172 which supplies water to a nozzle for flushing that pan.

The apparatus is provided with automatic controls which stop the motor 15 for the slurry pump every 30 minutes to permit the slurry agitating and delivery conduits to back flush by gravity, thus clearing the inlet to the pump 13 of any material tending to clog it. At the same time, solenoid valves for the flush nozzle plumbing 168–172 are opened to flush the parts as just described. This requires about 30 seconds, and there is no need to stop the processing of material while it goes on since the pressurized hopper 27 continues to supply slurry to the first separator unit IA even though the pump 13 is shut down.

The foregoing detailed description is given for clearness of understanding only and no unnecessary limitations should be understood therefrom as modifications will be obvious to those skilled in the art.

We claim:

1. A method of separating from ruminant animal feces the undigested fibrous material that is preponderantly short pieces which consist of bundles of capillary tubes, said method comprising the steps of:

First, forming a supply of slurry that contains ruminant animal feces and added liquids including urine and water;

Second, agitating said supply of slurry to make it substantially homogeneous;

Third, pumping a portion of said supply of generally homogenous slurry to a processing area;

Fourth, subjecting said portion of said slurry to a first stage of heavy mechanical pressure which compresses the capillary tubes of the fibrous pieces to express the majority of the liquid and finer solids therefrom while constantly separating therefrom a filtrate consisting preponderantly of liquid and finer solids, thereby providing a filter mass consisting preponderantly of said short fibrous pieces;

Fifth, subjecting said filter mass to a second stage of mechanical pressure which is several times heavier than said first stage to further compress the capillary tubes to express additional liquid and finer solids therefrom while continuously separating therefrom a second filtrate consisting preponderantly of said additional liquid and finer solids, thereby providing a cleansed filter mass consisting preponderantly of said fibrous pieces;

and then collecting said cleansed filter mass.

2. The method of claim 1 in which the filter mass from the first stage is mixed with fresh water to form a suspension which is subjected to said second stage of mechanical pressure.

3. The method of claim 2 in which a portion of the filtrate from the first stage is discharged to a storage means for use as liquid fertilizer and the balance is returned to the supply of slurry.

4. The method of claim 3 in which all of the second filtrate is returned to the supply of slurry.

5. The method of claim 1 in which all of the second filtrate is returned to the supply of slurry.

6. The method of claim 1 in which the pressure applied in the second stage is of the order of at least five to ten times the pressure applied in the first stage.

7. The combination of claim 1 in which the slurry includes waste water from animal washing and preparation.

8. The method of claim 1 in which the first stage includes separate first and second steps in each of which the filter mass is subjected to heavy pressure and during each of which filtrate is constantly separated therefrom.

9. The method of claim 8 in which from substantially zero to substantially 100° of the filtrate from the first step is discharged to a storage means for use as liquid fertilizer and the balance is returned to the supply of slurry.

10. The method of claim 9 in which all the filtrate from the second step is returned to the supply of slurry.

11. The method of claim 8 in which the second stage includes separate first and second steps in each of which the filter mass is subjected to heavy pressure and during each of which further second filtrate is constantly separated therefrom.

12. The method of claim 11 in which the heavy pressure applied in at least one step of each stage also applies a shearing force.

13. The method of claim 12 in which the heavy pressure also applies a shearing force in both steps of each stage.

14. The method of claim 1 in which the second stage includes a second separate step in which the filter mass is subjected to heavy pressure and during which further second filtrate is constantly separated therefrom 15. The method of claim 1 in which the heavy pressure in the first stage also applies a shearing force.

16. The method of claim 15 in which the heavy pressure in the second stage also applies a shearing force.

17. The method of claim 16 in which the filter mass from the first stage is mixed with fresh water to form a suspension which is subjected to said second stage of mechanical pressure.

18. The method of claim 1 in which the slurry entering the first stage is under a gas pressure slightly in excess of atmospheric pressure.

* * * * *